(12) United States Patent
Komatsu et al.

(10) Patent No.: US 7,113,373 B2
(45) Date of Patent: Sep. 26, 2006

(54) LOW-PROFILE FLEXIBLE DISK DRIVE SIMPLE IN STRUCTURE

(75) Inventors: Hisateru Komatsu, Tendo (JP); Noriyuki Kobayashi, Tendo (JP); Makoto Konno, Tendo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 423 days.

(21) Appl. No.: 10/767,891

(22) Filed: Jan. 28, 2004

(65) Prior Publication Data

US 2004/0184185 A1 Sep. 23, 2004

(30) Foreign Application Priority Data

Jan. 29, 2003 (JP) ............... 2003-020220

(51) Int. Cl.
*G11B 5/55* (2006.01)
(52) U.S. Cl. ............... 360/266.2; 360/266.6; 360/267.6
(58) Field of Classification Search ............ None
See application file for complete search history.

(56) References Cited

U.S. PATENT DOCUMENTS 4,809,107 A * 2/1989 Hasegawa ............ 360/267.6
5,012,374 A * 4/1991 Maeda ............... 360/267.6
5,481,421 A * 1/1996 Konno et al. ......... 360/267.6
6,282,065 B1 * 8/2001 Inoue et al. .......... 360/267.6
6,922,314 B1 * 7/2005 Maeda ............... 360/266.6
2003/0053247 A1 3/2003 Komatsu et al.

FOREIGN PATENT DOCUMENTS

JP 5-15164 U 2/1993
JP 2003-85901 A 3/2003

\* cited by examiner

*Primary Examiner*—R. S. Tupper
(74) *Attorney, Agent, or Firm*—Frishauf, Holtz, Goodman & Chick, P.C.

(57) ABSTRACT

A flexible disk drive comprises a main frame, a magnetic head, a head assembly supporting the magnetic head so as to move the magnetic head in a tracking direction, and a guide rod fixedly attached onto the main frame by a metal fitting to guide the head assembly in the tracking direction. The main frame is made of a sheet metal and is provided with a recessed portion having a sidewall. The sidewall is faced to an end face of the guide rod with a small space left therebetween so that the recessed portion restricts the movement of the guide rod in the tracking direction.

6 Claims, 6 Drawing Sheets

EXISTING ART

EXISTING ART

LOW-PROFILE FLEXIBLE DISK DRIVE SIMPLE IN STRUCTURE

This application claims priority to prior Japanese application JP 2003-20220, the disclosure of which is incorporated herein by reference.

BACKGROUND OF THE INVENTION

The present invention relates to a flexible disk drive for driving a flexible disk which is used to record/reproduce information or data and, in particular, to a thin-profile flexible disk drive provided with a guide rod for guiding a head assembly including a magnetic head in a tracking direction.

As well known in the art, a flexible disk drive (FDD) is an apparatus for performing data recording/reproducing operation upon a disk-shaped magnetic recording medium contained in the flexible disk (FD) inserted into the flexible disk drive. For example, the flexible disk drive is proposed by the present inventors in Japanese Patent Application Publication (JP-A) No. 2003-85901. The flexible disk drive mentioned above is typically installed in an electric apparatus such as a personal computer.

An existing flexible disk drive of the type comprises a magnetic head for reading/writing data from/to the magnetic recording medium of the-flexible disk loaded in the flexible disk drive, a head assembly supporting the magnetic head at its end so that the magnetic head is movable along a predetermined radial direction (tracking direction) with respect to the flexible disk, a stepping motor for moving the head assembly along the tracking direction, and a spindle motor for rotatably driving the magnetic recording medium in the flexible disk held in the flexible disk drive. The spindle motor comprises a direct-drive (DD) motor.

The head assembly is guided in the tracking direction by a rod-shaped member called a guide rod. The guide rod is rigidly or fixedly attached to a base plate of a main frame of the flexible disk drive by a metal fitting. The metal fitting is made of a metal material having elasticity, such as stainless steel (for example, SUS304), and has a length corresponding to the guide rod. The metal fitting is arranged on the base plate so as to engage the guide rod on the base plate. The guide rod extends through the head assembly and is slidably held by the head assembly. The metal fitting has one end and the other end fixedly attached to the base plate by screws, respectively.

The metal fitting is provided with a bent portion. The bent portion serves to prevent the guide rod from being displaced in its axis direction, that is, the tracking direction when the flexible disk drive is subjected to large mechanical shock.

The base plate is provided with a rectangular slot to receive the head assembly which is movable. Adjacent to the rectangular slot, a bent portion is formed. The bent portion serves to prevent the guide rod from being displaced in a direction perpendicular to the tracking direction when the flexible disk drive is subjected to large mechanical shock.

In order to suppress axial displacement or wobbling of the guide rod, another approach is proposed, for example, in Japanese Utility Model Application Publication (JP-U) No. H5-15164. In a pickup driving unit disclosed in the publication, a base plate is provided with a recessed portion having a wall which serves to restrict the movement of an end portion of the guide rod.

With the miniaturization (especially, the lower profile), the weight reduction, and the cost reduction of the electronic apparatus, the flexible disk drive to be installed in the electronic apparatus is also required to fulfil those demands for miniaturization (especially, the lower profile), the weight reduction, and the cost reduction.

In order to satisfy the above-mentioned requirement, it is effective to simplify the structure of the flexible disk drive. If the structure is simplified, it is possible to reduce the amount of materials, the number of manufacturing steps, the number of steps of controlling the dimension of individual parts, and the number of steps of controlling the relationship between dimensions of respective parts.

SUMMARY OF THE INVENTION

It is therefore an object of the present invention to provide a flexible disk drive having a simple structure and yet is capable of reliably and stably holding a guide rod.

According to an aspect of the present invention, there is provided a flexible disk drive which is for driving a flexible disk used to record/reproduce data and which comprises a main frame, a magnetic head for recording/reproducing data to/from the flexible disk, a head assembly movably mounted on the main frame and supporting the magnetic head so that the magnetic head is movable in a tracking direction, and a guide rod fixedly attached by a metal fitting on the main frame of the flexible disk drive for guiding the head assembly in the tracking direction. The main frame is made of a metal sheet and is provided with a recessed portion which has a sidewall. The sidewall is faced to an end face of the guide rod with a small space left therebetween so that the recessed portion restricts the movement of the guide rod in the tracking direction.

Another objects, features, and advantages of the present invention will become clear as the description proceeds.

DESCRIPTION OF THE PREFERRED EMBODIMENT

Figure 1A:
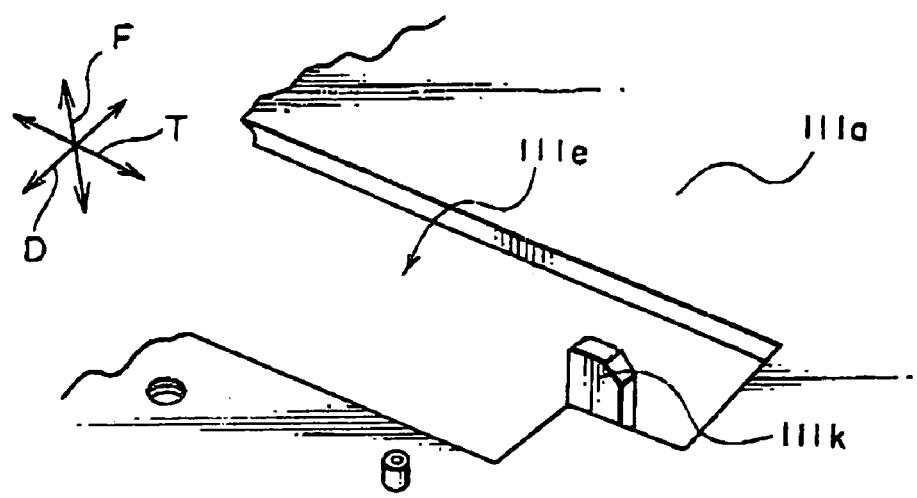
FIG. 1A is a perspective view showing a characteristic part of an existing flexible disk drive in the state where a guide rod is removed.

In order to facilitate an understanding of the present invention, description will at first be made about the above-mentioned existing flexible disk drive with reference to the drawing.

Figure 1B:
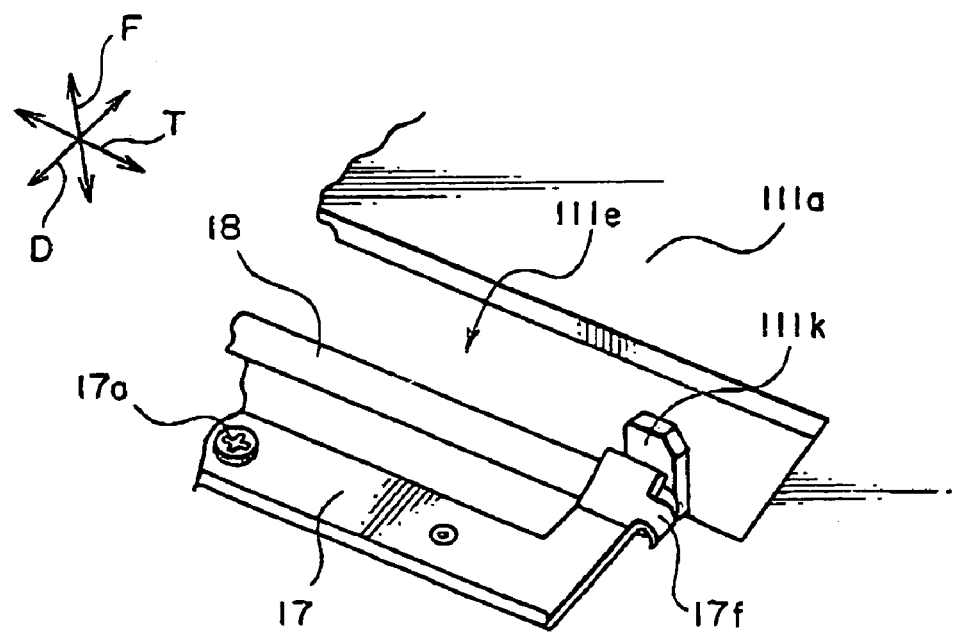
FIG. 1B is a perspective view similar to FIG. 1A in the state where the guide rod is attached.

Referring to FIGS. 1A and 1B, the existing flexible disk drive comprises a head assembly (not shown) which is guided in a tracking direction T by a rod-shaped member called a guide rod 18. The guide rod 18 is rigidly or fixedly attached to a principal surface of a base plate 111a of a main frame (not shown) of the flexible disk drive by a metal fitting 17. The metal fitting 17 is made of a metal material having elasticity, such as stainless steel (for example, SUS304) and has a length corresponding to the guide rod 18. The metal fitting 17 is arranged on the base plate 111a so as to engage the guide rod 18 onto the base plate 111a. The guide rod 18 extends through the head assembly and is slidably held by the head assembly. The metal fitting has one end and the other end fixedly attached to the base plate 111a by screws 17a (only one being illustrated), respectively.

The metal fitting 17 is provided with a bent portion 17f. The bent portion 17f serves to prevent the guide rod 18 from being displaced in its axial direction, that is, the tracking direction T when the flexible disk drive is subjected to large mechanical shock.

The base plate 111a is provided with a rectangular slot 111e to receive the head assembly which is movable. Adjacent to the rectangular slot 111e, a bent portion 111k is formed. The bent portion 111k serves to prevent the guide rod 18 from being displaced in a direction D perpendicular to the tracking direction T when the flexible disk drive is subjected to large mechanical shock.

Now, a preferred embodiment of the present invention will be described with reference to the drawing.

Figure 2:
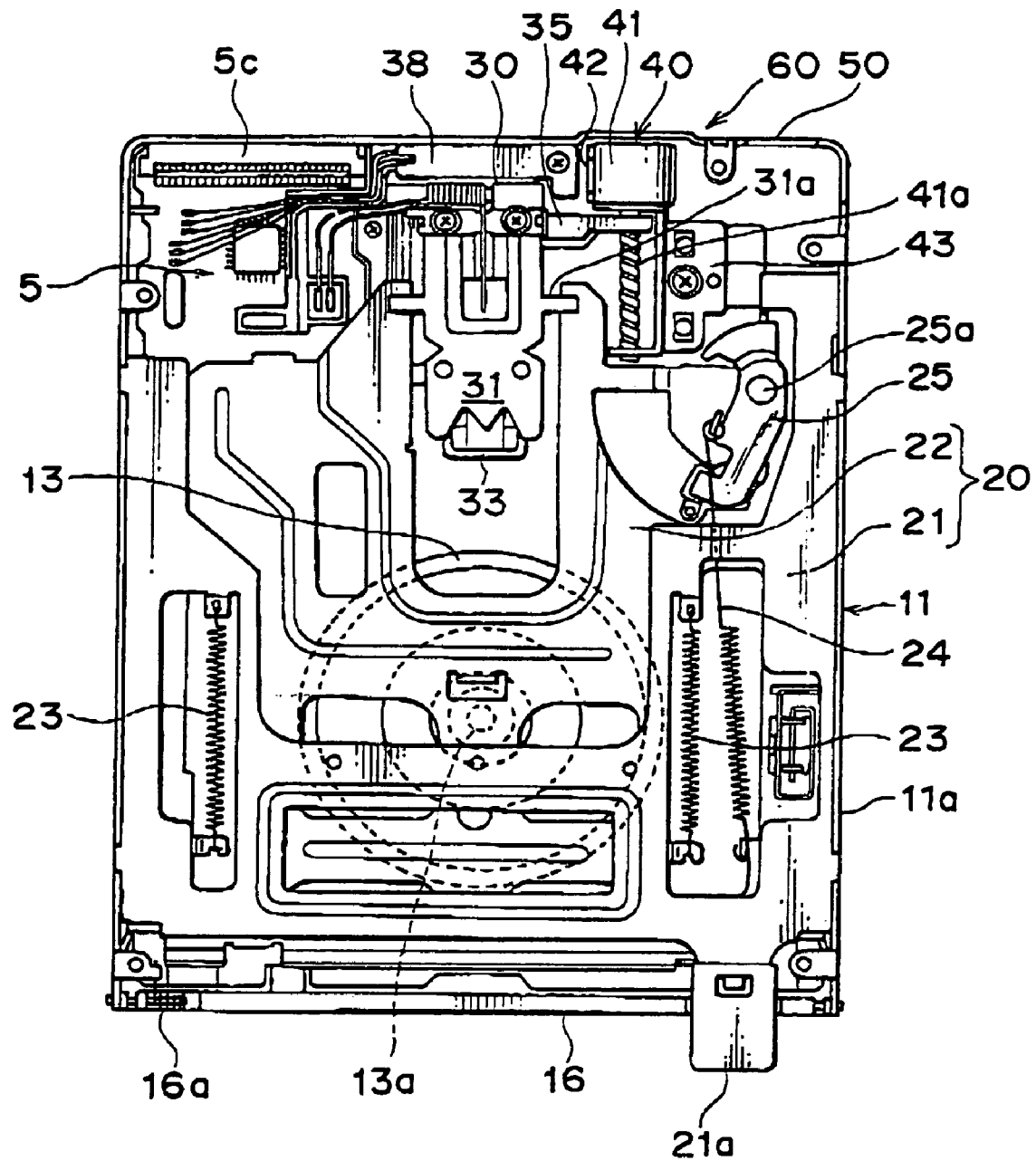
FIG. 2 is a top plan view showing a flexible disk drive according to an embodiment of the present invention in the state where a top cover is removed.

Referring to FIG. 2, a flexible disk drive 60 according to the embodiment of this invention has a main frame 11, a disk loading/unloading mechanism 20, a front bezel 16, a head assembly 30, and a screw-type stepping motor 40. The main frame 11 has a box-like shape with a top side and a front side thereof opened. The front bezel 16 is movably attached to the front side of the main frame 11 so as to open and close the front side.

The disk loading/unloading mechanism 20 comprises an eject plate 21 and a disk holder 22 disposed under or inside of the eject plate 21. A disk cartridge containing a flexible magnetic disk is received in a space between the disk holder 22 and a base plate 11a of the main frame 11 and above a turntable 13. The eject plate 21 is urged forward (downward in FIG. 2) by a pair of coil springs 23 disposed on both sides thereof with respect to the disk holder 22. The disk holder 22 is provided with an eject lever 25 formed at its one end to be rotatable about a shaft 25a. A coil spring 24 is connected between the eject lever 25 and the disk holder 22.

When the disk cartridge of the flexible magnetic disk is loaded, one end portion of the disk cartridge is brought into contact with one end of the eject lever 25 to rotate the eject lever 25 in the clockwise direction about the shaft 25a. When the eject lever 25 reaches a predetermined position, the eject lever 25 is engaged with the disk holder 22 to be stopped.

On the other hand, in order to eject the disk cartridge, an eject button 24 is depressed (upward in FIG. 2). Then, the engagement between the eject lever 25 and the disk holder 22 is released. Under restoring force of the coil spring 24, the eject lever 25 is rotated in the counterclockwise direction to thereby eject the disk cartridge.

Figure 3:
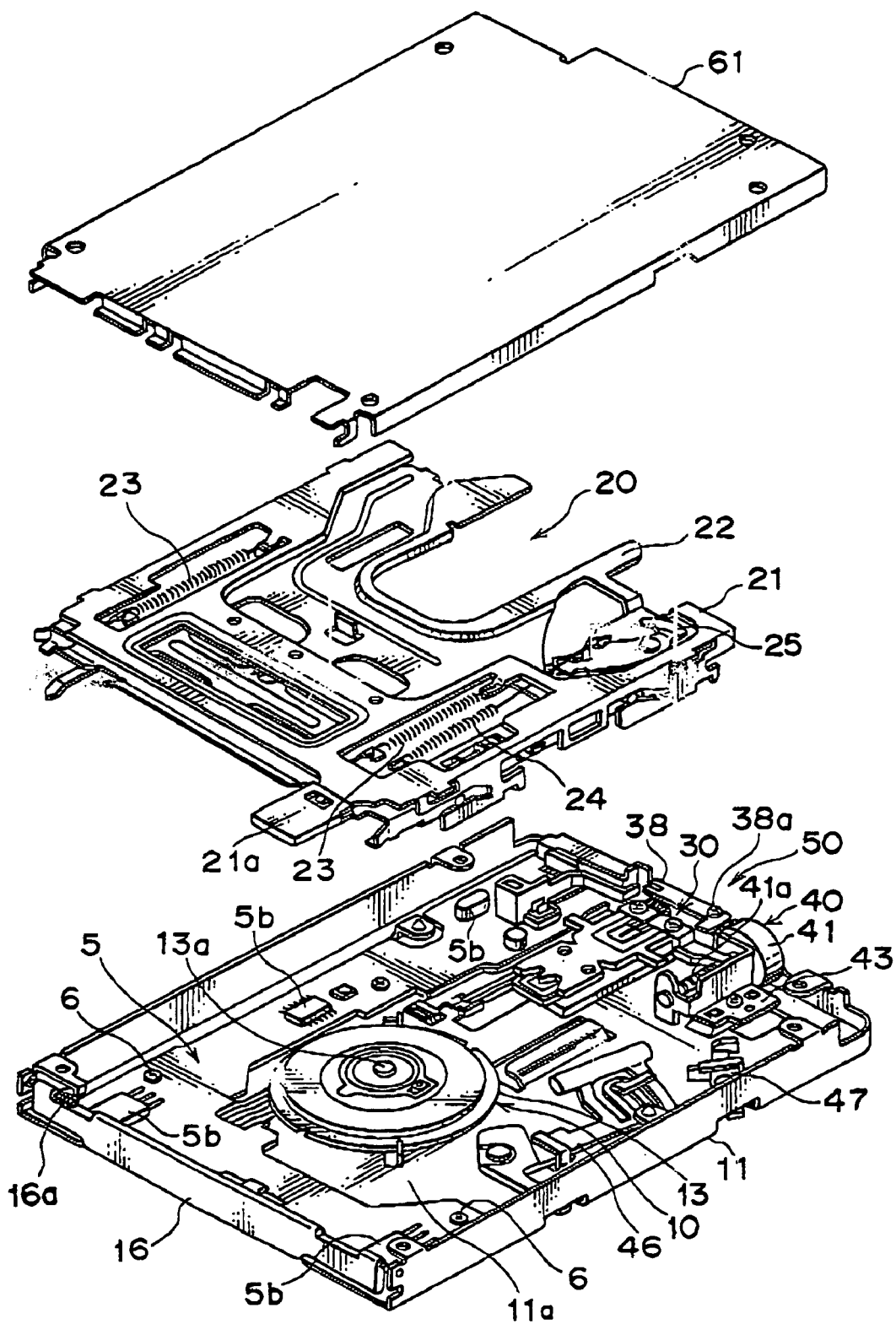
FIG. 3 is an exploded perspective view showing the flexible disk drive illustrated in FIG. 2.

Referring to FIG. 3, the flexible disk drive 60 comprises a main portion 50, the disk loading/unloading mechanism 20 received in the main portion 50, and a cover 61 for covering an upper portion thereof.

Figure 4:
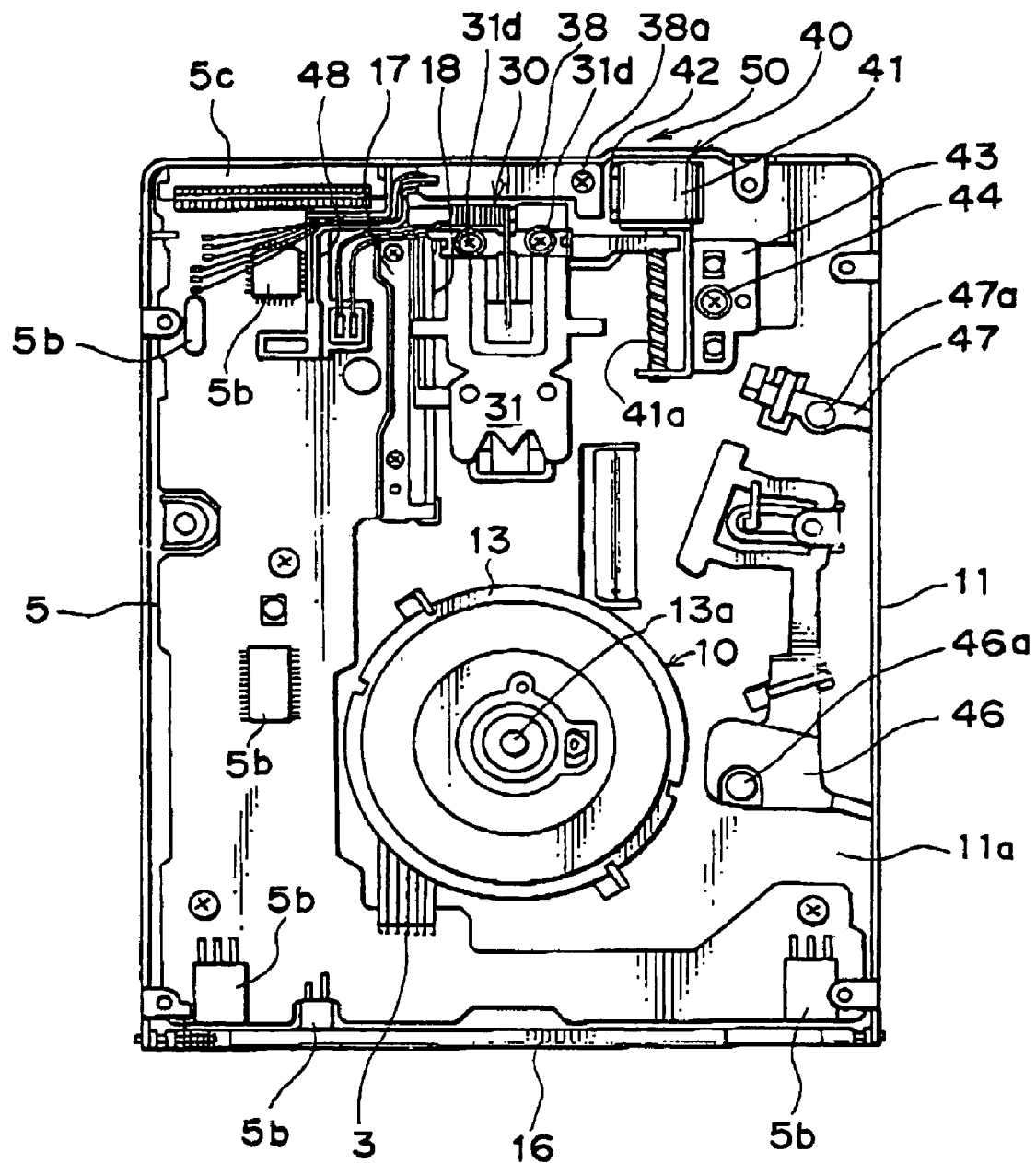
FIG. 4 is a top plan view showing a a main portion of the flexible disk drive illustrated in FIG. 2 in the state where a top cover and a loading/unloading mechanism are removed.
Figure 5:
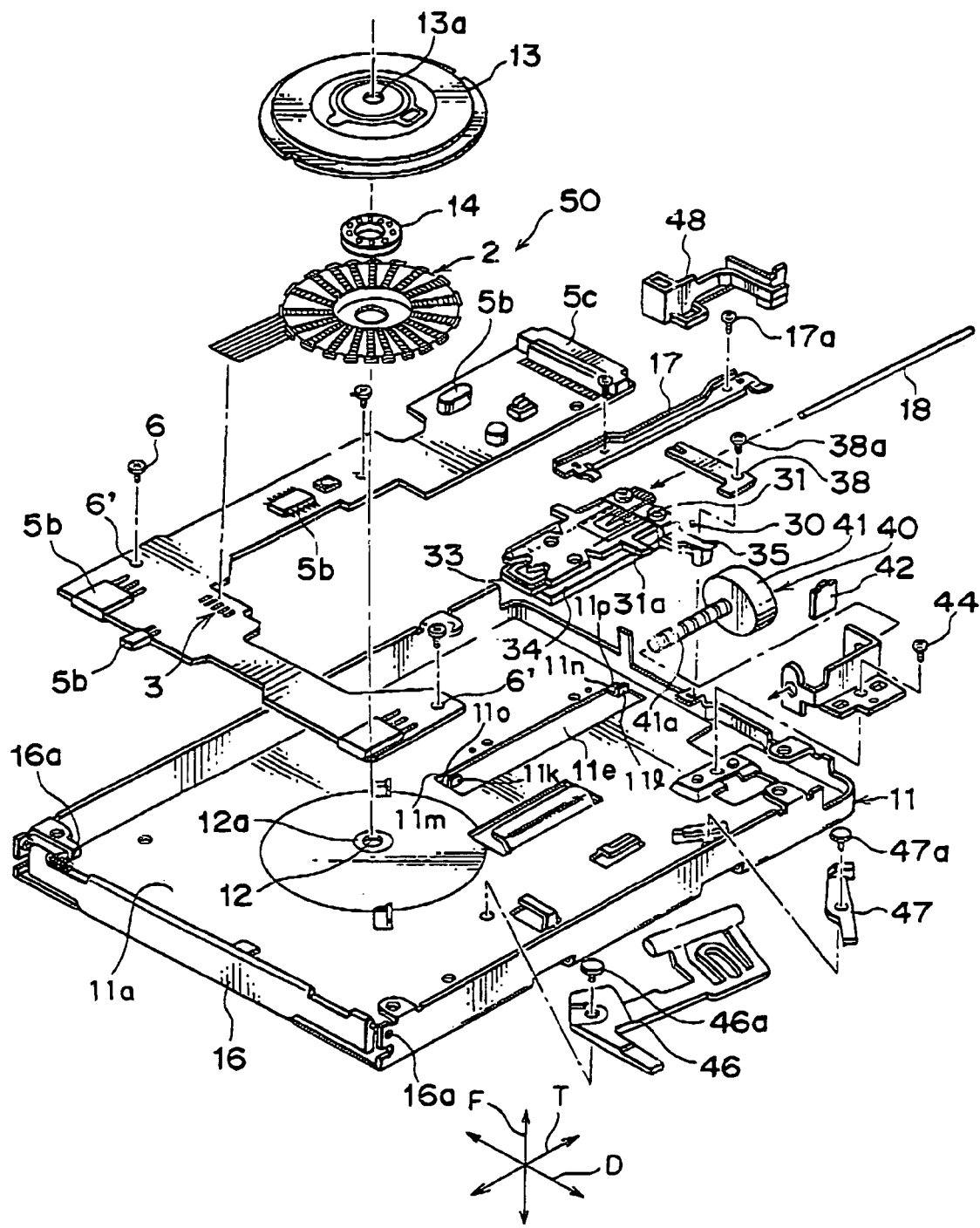
FIG. 5 is an exploded perspective view showing the main portion of the flexible disk drive illustrated in FIG. 4.

Referring to FIGS. 4 and 5, the main portion 50 of the flexible disk drive 60 has the main frame 11, a spindle motor 10 mounted on the base plate 11a of the main frame 11, and a main board 5 disposed on the base plate 11a in an area surrounding the spindle motor 10.

The head assembly 30 is disposed at a rear end of the base plate 11a of the main frame 11. The head assembly 30 has one side inserted into a guide rail 18 and the other side engaged with a helical groove or threaded portion of a drive rod 41a extending from a main body 41 of the stepping motor 40.

On a rear side of the head assembly 30, aboard 38 for electric connection is fixed by a screw 38a. The step motor 40 is mounted on the base plate 11a to be adjacent to one side of the head assembly 30. The step motor 40 is positioned and fixed on the base plate 11a by fastening a metal fitting 43 by a screw 44. Furthermore, a circuit board 42 for supplying electric current is arranged adjacent to one side of the stop motor 40.

Figure 6A:
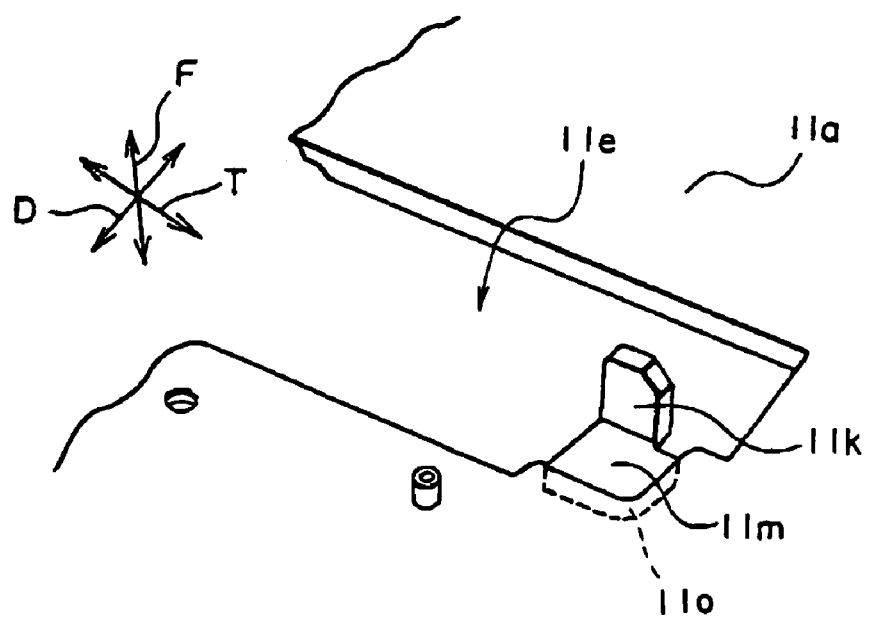
FIG. 6A is a perspective view showing a characteristic part of the flexible disk drive illustrated in FIG. 2 in the state where a guide rod is removed.
Figure 6B:
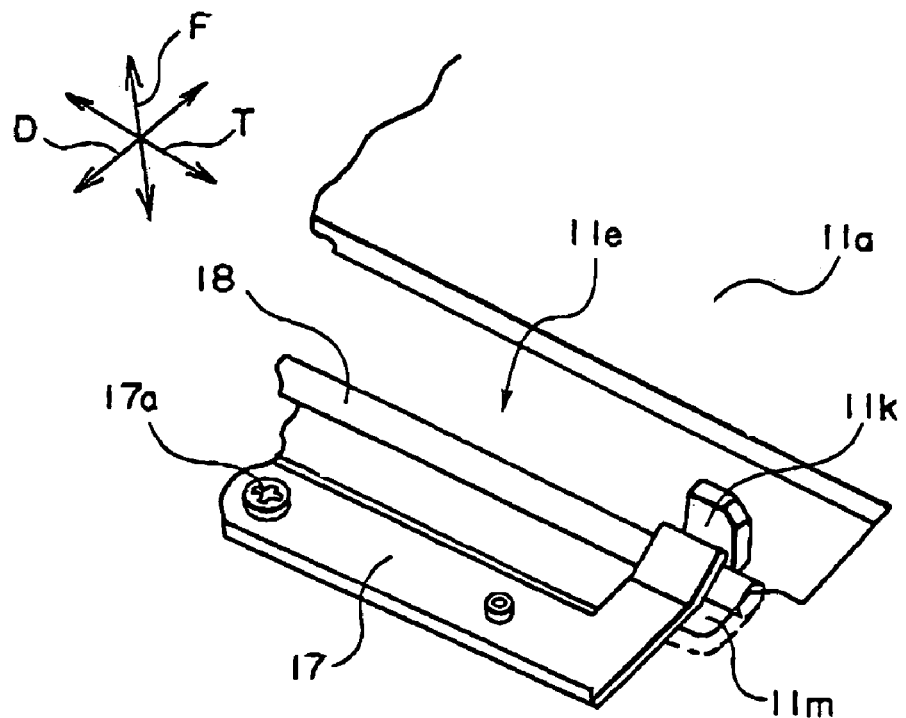
FIG. 6B is a perspective view similar to FIG. 6A in the state where the guide rod is attached.

Referring to FIGS. 5, 6A, and 6B, the guide rod 18 is fixed to the base plate 11a by a metal fitting 17 to extend in the tracking direction T. The head assembly 30 (not shown in FIGS. 6A and 6B) is guided in the tracking direction T by the guide rod 18.

The base plate 11a is formed by press working of a metal sheet. The base plate 11a is provided with a pair of recessed portions 11m and 11n corresponding to opposite ends of the guide rod 18, respectively. The recessed portions 11m and 11n have sidewalls 110 and 11p, respectively.

The sidewalls 11o and 11p of the recessed portions 11m and 11n are faced to end faces of the guide rod 18 with a small space left therebetween, respectively. With this structure, the movement of the guide rod 18 is restricted in the tracking direction T even if the flexible disk drive is subjected to mechanical shock.

In order to reliably prevent the end faces of the guide rod 18 from being released from the recessed portions 11m and 11n even if the flexible disk drive is subjected to very large mechanical shock, it is preferable that the depth of the recessed portions 11m and 11n is not smaller than the radius of the guide rod 18.

The metal fitting 17 is a single integral part extending to the length corresponding to the total length of the guide rod 18. The metal fitting 17 is attached to the base plate 11a by screws 17a. The metal fitting 17 may be made of elastic metal.

Furthermore, the metal fitting 17 cooperates with the base plate 11a (including the sidewalls 11o and 11p and the bent portions 11k and 11l) to press and hold a peripheral surface of the guide rod 18. In other words, the metal fitting 17 presses and holds the peripheral surface of the guide rod 18 in the vicinity of the sidewalls 11o and 11p and the bent portions 11k and 11l. Thus, the movement of the guide rod 18 is delimited in all directions including the tracking direction T. The all directions include a focus direction F, the tracking direction T, and a tangent direction D of the rotation of the flexible disk.

Meanwhile, the base plate 11a originally has a number of press-worked portions other than the recessed portions 11m and 11n. Therefore, the number of press working steps for the base plate 11a is not increased in order to form the recessed portions 11m and 11n.

It is noted here that the metal fitting 17 has a simple structure without the bent portions (17f) required in the metal fitting 17 of the existing flexible disk drive shown in FIGS. 1A and 1B. Consequently, the number of producing steps is small.

Furthermore, the base plate 11a has an upper surface provided with a push-up lever 46 for pushing up the disk cartridge in cooperation with the eject plate 21 (FIG. 3), the eject lever 25,and an unlock lever 47 for releasing the engagement with the disk holder 22.

Referring to FIG. 5, the main portion 50 is assembled in the following manner. At first, the main board 5 is fixed to the base plate 11a of the main frame 11 by a screw 6. The metal fitting 17 is fixed by the screws 17a so as to hold the inside of the rear end of the main board 5.

Next, a flexible board 2 with a solenoid coil disposed thereon is mounted to a bottom portion of the base plate 11a of the main frame 11 in alignment with a through hole 12 provided with a bearing 12a. A bearing 14 is disposed at the center of the flexible board 2. A rotating shaft 13a of the turntable 13 is rotatably received in the through hole 12 via the bearing 12a. Here, the turntable 13 is disposed in the manner such that cut-and-raised portions formed on the base plate 11a are fitted in grooves formed in the turntable 13. Once the turntable 13 is mounted, the turntable 13 is rotatable but is prevented from being removed upward unless the grooves and the cut-and-raised portions coincide in rotating position with each other.

The head assembly 30 has a U-shaped vertical section and has upper and lower head support members 31 and 34 each of which supports a magnetic head element 33 inside. Adjacent to one side of the head assembly 30, disposed is the stepping motor 40 having the drive rod 41a projecting from one end thereof. The stepping motor 40 is fixed by fastening the metal fitting 43 to a projected portion formed on the base plate 11a by the screw 44 so that an engaging portion 35 formed at one end of the head assembly 30 is engaged with the helical groove formed on the drive rod 41a of the stepping motor 40.

Furthermore, an S-shaped member 48 made of plastic is arranged to guide a cable connecting the head assembly 30 with the main board 5 and to reinforce the flexible disk drive.

Furthermore, the push-up lever 46 for pushing the disk cartridge loaded in the flexible disk drive outward and forward in cooperation of the eject plate 21 (FIG. 3) when the disk cartridge is ejected is rotatably supported by a pin 46a. Likewise, the unlock lever 47 for lifting the disk holder 22 and releasing the engagement of the eject plate 21 and the disk holder 22 in the back-and-forth direction is rotatably supported by a pin 46b. When the main portion 50 is assembled as shown in FIG. 5, the structure shown in FIG. 4 is obtained.

Furthermore, when the disk loading/unloading mechanism 20 is mounted in the main portion 50 as shown in FIG. 3, the structure shown in FIG. 2 is completed. Furthermore, by attaching the cover 61 as shown in FIG. 3, assembling of the disk drive is finished.

While the present invention has thus far been described in conjunction with the preferred embodiment thereof, it will readily be possible for those skilled in the art to put the present invention into practice in various other manners without d parting from the scope of the present invention.

What is claimed is:

1. A flexible disk drive for driving a flexible disk used to record/reproduce data, said flexible disk drive comprising:
   a main frame;
   a magnetic head for recording/reproducing data to/from the flexible disk;
   a head assembly movably mounted on said main frame and supporting said magnetic head so that said magnetic head is movable in a tracking direction; and
   a guide rod fixedly attached by a metal fitting on said main frame of said flexible disk drive for guiding said head assembly in said tracking direction;
   said main frame being made of a metal sheet and being provided with a recessed portion having a sidewall;
   said sidewall being faced to an end face of said guide rod with a small space left therebetween so that said recessed portion restricts the movement of said guide rod in said tracking direction.

2. The flexible disk drive according to claim 1, wherein said metal fitting is a single integral part extending to the length corresponding to the total length of said guide rod.

3. The flexible disk drive according to claim 1, wherein said main frame is provided with two recessed portions corresponding to opposite ends of said guide rod.

4. The flexible disk drive according to claim 1, wherein said metal fitting presses and holds a peripheral surface of said guide rod in cooperation with said main frame to thereby restrict the movement of said guide rod in two directions perpendicular to said tracking direction.

5. The flexible disk drive according to claim 1, wherein said metal fitting presses and holds a peripheral surface of said guide rod in the vicinity of said recessed portion of said main frame.

6. The flexible disk drive according to claim 1, wherein the depth of the recessed portion is not smaller than the radius of said guide rod.

* * * * *